(No Model.)
G. W. MULLENNIX.
COMBINED HARROW AND DRAG.
No. 400,785. Patented Apr. 2, 1889.
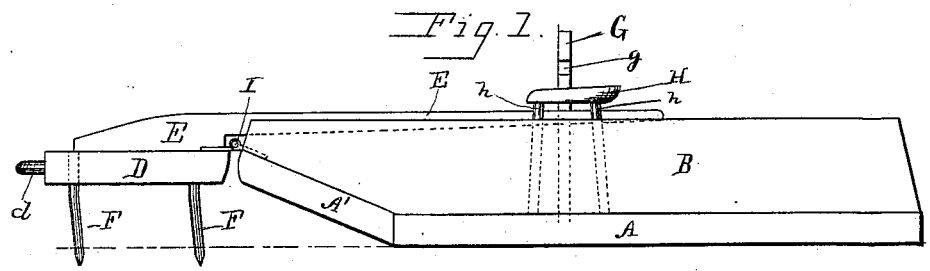
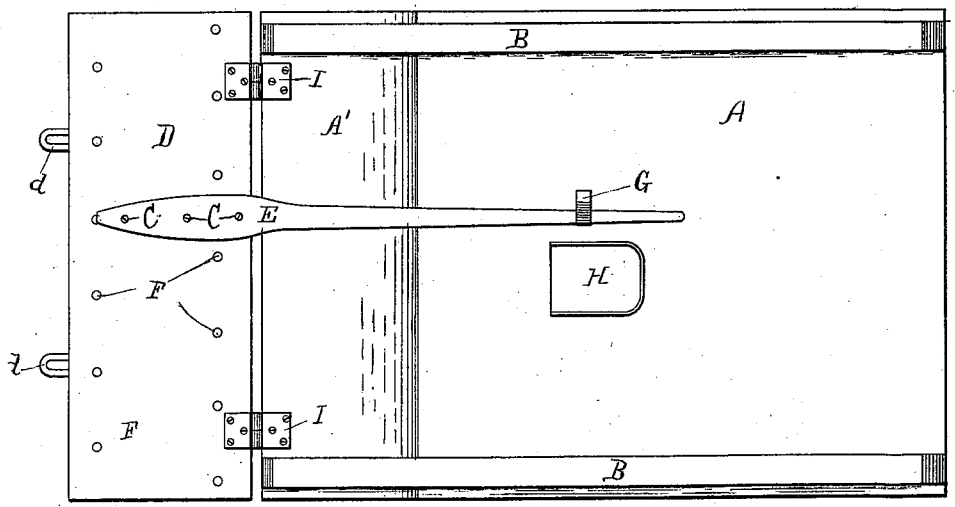
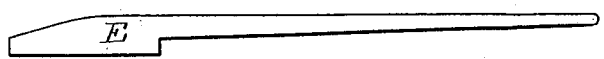
WITNESSES.
R. A. Balderson.
Wm Geleston.
INVENTOR:
Geo. W. Mullennix
BY E. H. Geleston
HIS ATTORNEY.

UNITED STATES PATENT OFFICE.

GEORGE W. MULLENNIX, OF YATES CENTRE, KANSAS.

COMBINED HARROW AND DRAG.

SPECIFICATION forming part of Letters Patent No. 400,785, dated April 2, 1889.

Application filed September 5, 1888. Serial No. 284,650. (No model.)

*To all whom it may concern:*

Be it known that I, GEORGE W. MULLENNIX, a citizen of the United States, residing at Yates Centre, in the county of Woodson and State of Kansas, have invented certain new and useful Improvements in a Combined Harrow and Drag; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to combined harrows and drags; and its objects are, first, to provide readily for their interchangeable use as harrows or drags, or both conjointly; second, to regulate the depth of insertion of the harrow-teeth from the seat; third, to permit the harrow to clear any given section of land in its progress by changing the angle of inclination from the seat; fourth, to maintain a variable adjustment of the harrow; and, fifth, to attain these ends with structural simplicity and economy. I accomplish these purposes by the devices illustrated in the accompanying drawings, in which—

Figure 1 represents a side elevation of a machine operatively embodying the essential features of my invention. Fig. 2 is a plan view of the same. Fig. 3 is a detail view of the ratchet-bar by which the adjustment of the harrow is maintained, and Fig. 4 is a detail view of the operating-lever.

The same designations indicate corresponding parts in the several views.

A represents a drag formed with an inclined forward end, A', and B represents the sides for preventing the accumulation of dirt on the drag. They are rigidly secured to the respective edges and extend their entire length, thereby affording a secure brace for the drag.

Rigidly secured to the center of the upper face of the drag is a vertical rack-bar, G, having rectangular teeth, as $g$, on its side, for purposes hereinafter stated.

H represents a seat for the operator, which is supported by lugs $h$, placed on the bottom of the drag.

I have arranged the harrow, which is represented at D, in front of the drag, it consisting of a frame having downwardly-extending teeth F secured therein. This frame is hinged at its upper rear edge to the forward and upward end of the drag, and is thus allowed a swinging movement, the hinges being represented at I.

The power or draft is attached to the front of the harrow at $d$, representing a staple.

To tilt the harrow up or down to force it in or out of the soil, I have provided a long lever, E, having one end rigidly secured to the center of the harrow, and its opposite end extended back adjacent to the rack-bar in reach of the operator. The rear end of this lever is formed to fit between the rectangular teeth $g$ on the bar G, where it is placed when the harrow is adjusted. The length of the lever renders the operation of the swinging of the harrow easy and rapid.

Having thus described my invention, what I claim as new, and desire to secure by Letters Patent, is—

The combination, with the drag, as A, having an inclined forward end, and sides, as B, of a harrow, as D, hinged to the forward upper end of the drag, teeth F, a long lever, as E, rigidly secured to the upper side of the harrow and extending back over the drag, and a vertically-arranged rack-bar, as G, having rectangular teeth, as $g$, on its side, between which the end of the lever is adapted to be placed, substantially as described.

In testimony whereof I affix my signature in presence of two witnesses.

GEORGE W. MULLENNIX.

Witnesses:
P. S. RAY,
JAMES POWELL.